(12) United States Patent
Solomond et al.

(10) Patent No.: US 6,398,201 B1
(45) Date of Patent: Jun. 4, 2002

(54) VEHICLE SHOCK ABSORBER PAD HAVING A SPRING CONTAINMENT FLANGE

(75) Inventors: Jonathan P. Solomond, Royal Oak; James J. Johnson, Metamora; Michael S. Weaver, Clarkston, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/651,559

(22) Filed: Aug. 30, 2000

Related U.S. Application Data

(63) Continuation-in-part of application No. 09/169,632, filed on Oct. 9, 1998, now abandoned.

(51) Int. Cl.[7] .............................................. B60G 13/00
(52) U.S. Cl. ................ 267/220; 267/170; 280/124.147; 280/124.154
(58) Field of Search ........................... 267/140.11, 220, 267/219, 221, 33, 170, 141.1, 141.3, 141.4, 292; 280/124.154, 124.155, 124.147; 188/321.11

(56) References Cited

U.S. PATENT DOCUMENTS

| | | | | |
|---|---|---|---|---|
| 4,256,292 A | * | 3/1981 | Sullivan, Jr. et al. | ....... 267/220 |
| 4,462,608 A | * | 7/1984 | Lederman | ............ 280/124.154 |
| 4,721,325 A | * | 1/1988 | Mackovjak et al. | .. 280/124.154 |
| 5,454,585 A | * | 10/1995 | Dronen et al. | .......... 267/220 X |
| 5,676,355 A | * | 10/1997 | Hayashi et al. | ............. 267/221 |
| 5,984,283 A | * | 11/1999 | Tsuiki et al. | .................. 267/33 |

* cited by examiner

Primary Examiner—Pam Rodriguez
(74) Attorney, Agent, or Firm—Ralph E. Smith

(57) ABSTRACT

The restoring coil spring of a vehicle shock absorber can be seated on an annular elastomeric pad that is equipped with a reinforced peripheral flange adapted to maintain the lowermost convolution of the spring on the elastomeric pad should the spring break during service. An annular steel band is incorporated into the elastomeric flange to provide a reinforced flange structure resistant to radial deformation.

3 Claims, 3 Drawing Sheets

VEHICLE SHOCK ABSORBER PAD HAVING A SPRING CONTAINMENT FLANGE

CROSS REFERENCE TO A RELATED PATENT APPLICATION

This is a continuation-in-part of our copending patent application, Ser. No. 09/169,632 filed on Oct. 9, 1998 now abandoned.

FIELD OF THE INVENTION

This invention relates to vehicle shock absorbers.

BACKGROUND AND SUMMARY OF THE INVENTION

This invention relates to a vehicle wheel suspension, and particularly to an annular elastomeric pad for seating the lower end of a coil spring that surrounds a shock absorber strut for the wheel suspension.

Wheel suspensions of interest are shown in U.S. Pat. No. 4,721,325 to J. Mackovjak, U.S. Pat. No. 5,454,585 to G. Dronen et all, and U.S. Pat. No. 5,676,355 to N. Mayashi.

The vehicle suspension of particular interest comprises a shock absorber strut that includes an upstanding fluid cylinder having a piston rod connected to the vehicle body and a shock absorbing cylinder connected to the vehicle wheel suspension arm. The vehicle suspension further includes an upper spring seat attached to the piston rod and a lower spring seat attached to the shock absorbing cylinder. A coil spring is trained between the two spring seats in surrounding relation to the shock absorber strut. The axis of the spring is offset from the shock absorber strut axis.

The present invention relates to the construction of the elastomeric lower spring seating pad, whereby a desired eccentricity can be maintained between the spring and the strut without unduly increasing the manufacturing cost of the lower seat support. The elastomeric pad acts as an isolator for absorbing high frequency suspension noise.

A rigid steel platform is affixed to the shock absorber cylinder for supporting the elastomeric pad. The pad includes an upstanding inner lip for locating the lowermost convolution of the coil spring in eccentric relation to the shock absorber axis. The elastomeric pad further includes an upstanding peripheral flange that surrounds the lowermost convolution of the coil spring, whereby the flange acts to contain the spring in event of coil spring failure; the failed spring is prevented from forcibly impacting the vehicle tire in such fashion as to possibly produce a tire puncture.

The peripheral flange is reinforced by means of an endless annular steel band incorporated into the flange during the operation of molding the elastomeric pad.

Further features of the invention will be apparent from the attached drawings and description of an illustrative embodiment of the invention.

DESCRIPTION OF A PREFERRED EMBODIMENT OF THE INVENTION

Figure 1:
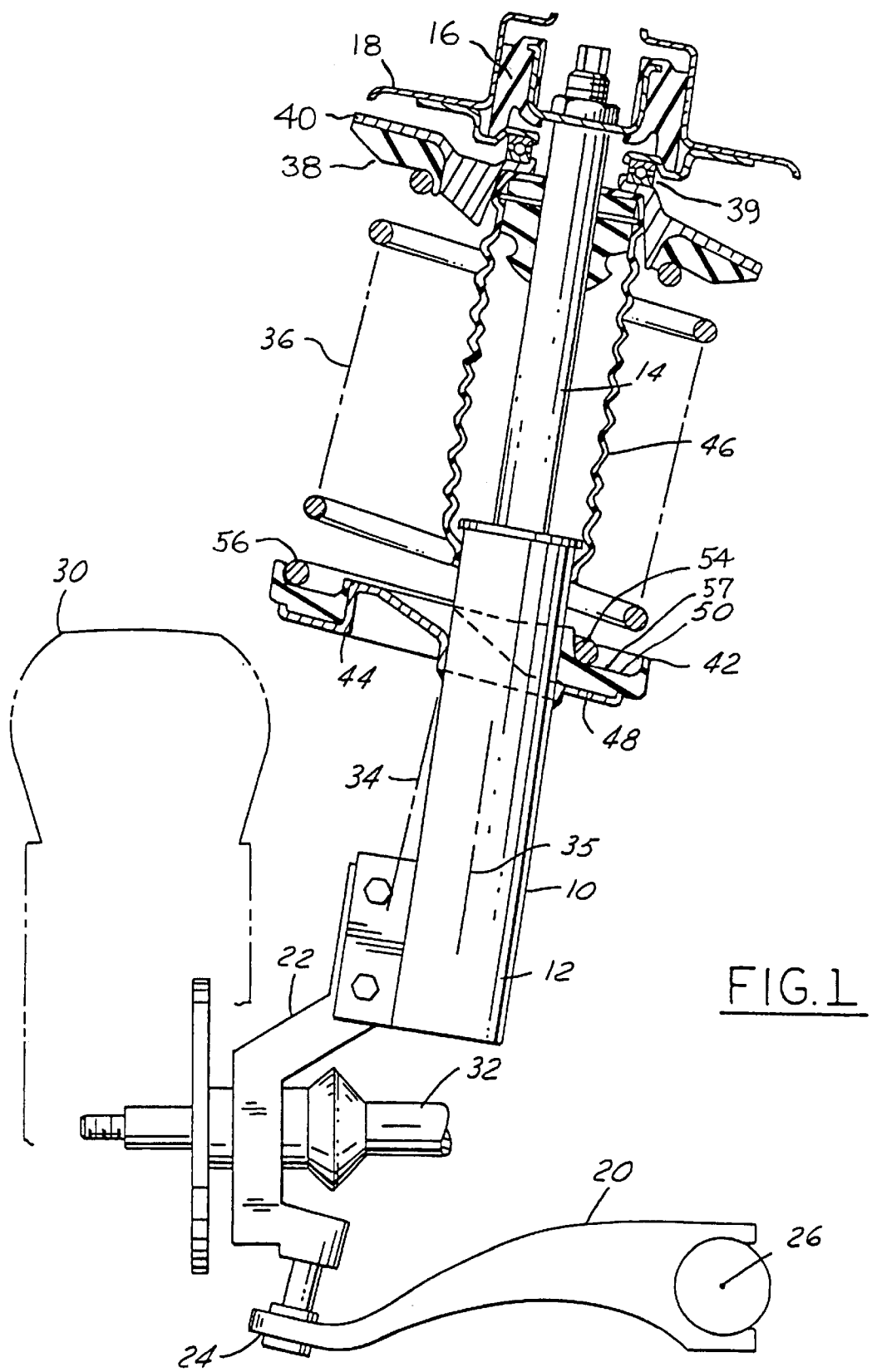
FIG. 1 is a longitudinal sectional view of a vehicle wheel suspension constructed according to the present invention.

Referring to FIG. 1, there is shown a vehicle wheel suspension that includes a shock absorber strut 10 having a fluid cylinder 12 and piston rod 14. The upper end of piston rod 14 has an elastic mounting connection 16 with a vehicle body 18. The lower end of fluid cylinder 12 is connected to wheel suspension arm 20 via a knuckle 22.

Bracket 22 has a ball-socket connection 24 with suspension arm 20. The suspension arm has a pivot connection 26 with the vehicle frame, whereby arm 20 can pivot around the axis of pivot connection 26 in accordance with changes in the vehicle wheel position due to terrain irregularities.

Wheel 30 (shown in dashed lines) has an axle 32 that is rotatable in suitable bearings carried by knuckle 22. The wheel can be steered around an axis 34 extending through ball-socket joint 24 by a steering arm, not shown. Shock absorber strut 10 has a longitudinal axis 35 angularly offset from steering axis 34.

An annular coil spring 36 surrounds shock absorber strut 10 so as to be compressed by a decrease in the strut length. The coil spring generates a counteracting restoring force tending to maintain the vehicle body in a reasonably level attitude in spite of changes in shock absorber strut length associated with terrain irregularities.

The upper end of coil spring 36 is seated against an elastomeric noise isolator pad 38 carried on an upper rigid platform 40. The upper spring/platform 40 is free to rotate around the piston rod by means of a bearing assembly 39. The lower end of coil spring 36 is seated against an elastomeric sound isolator pad 42 carried on a lower rigid platform 44 suitably attached to cylinder 12, e.g., by welding. Platforms 40 and 44 are usually steel stampings.

Platform 44 and elastomeric isolator pad 42 are constructed so that the axis of coil spring 36 is angularly offset from the axis 35 of the shock absorber. In the illustrated position of the vehicle wheel, the spring axis is coincident with steering axis 34.

The illustrated wheel suspension includes an annular bellows-type dust cover 46 surrounding the piston rod 14 and a portion of cylinder 12, so as to exclude dirt from the piston rod-cylinder joint. The upper end of dust cover 46 is anchored to the upper spring seat (40). The lower end of dust cover 46 is in contact with cylinder 12.

Elastomeric pad 42 has a bottom surface 48 positioned on rigid platform 44. The platform has an upstanding peripheral lip 52 that surrounds the bottom portion of pad 42, thereby preventing dislocation of the pad on the platform. The pad is additionally stabilized by an upwardly embossed section 80 of platform 44.

Embossed section 80 has an outer circular edge surface 81 concentric around the coil spring axis 34 so as to confine the inner edge surface of the elastomeric annular pad 42. Embossed section 80 merges into a collar section 82 that is concentric around the shock absorber axis 35. Collar section 82 serves as a mechanism for mounting platform 44 on the shock absorber. The platform is preferably a one piece steel stamping devoid of hard-to-manufacture features.

Figure 2:
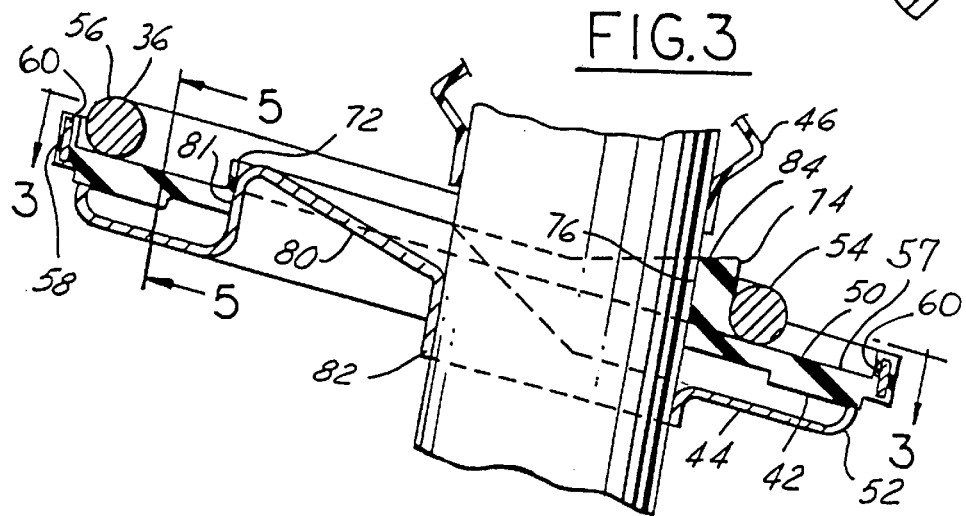
FIG. 2 is a fragmentary enlarged sectional view taken in the same direction as FIG. 1, but showing the elastomeric spring seat pad in greater detail

As shown in FIGS. 1 and 2, coil spring 36 has a lowermost convolution seated on the upper surface 50 of elastomeric isolator pad 42. The lower spring convolution includes an inner coil section 54, an outer circular coil section 56, and a spiral section 55 joining sections 54 and 56. The lowermost convolution of the spring is. centered on surface 50 of the elastomeric pad 42 by the joint action of upstanding peripheral flange 58 and an upstanding annular lip 72 concentric around coil spring axis 35. Peripheral flange 58 controls the position of coil section 56, whereas inner annular lip 72 controls the position of coil section 54.

Figure 3:
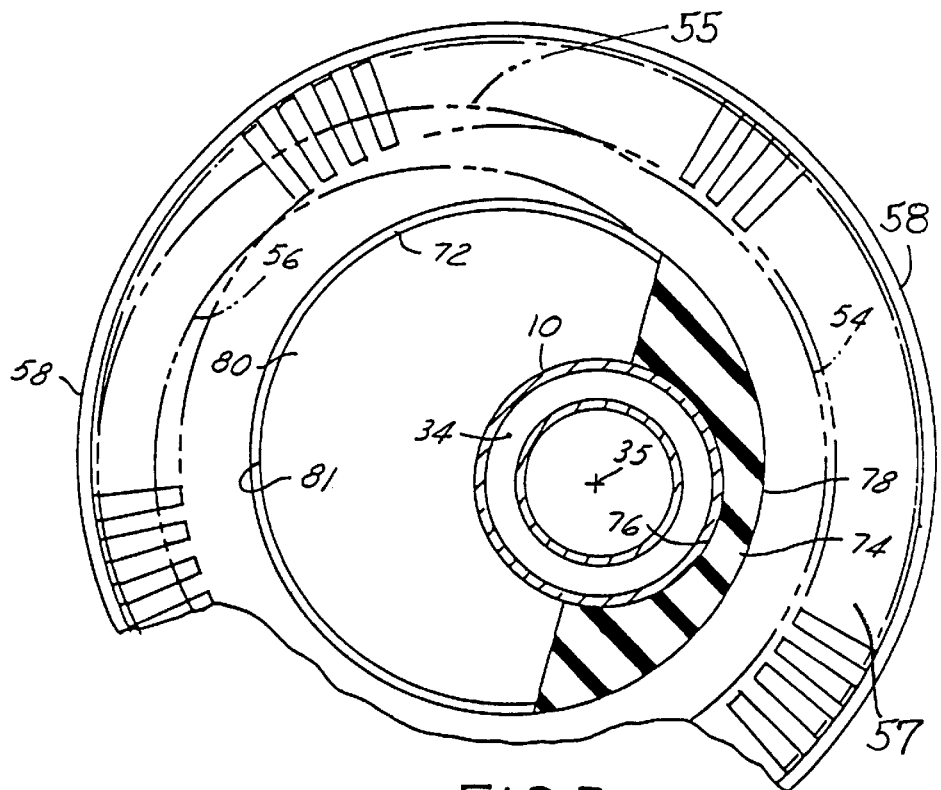
FIG. 3 is a fragmentary sectional view taken on line 3—3 in FIG. 2.

Inner annular lip 72 includes a slightly thickened section 74 that encircles (or envelopes) approximately one half of the strut 10 circumference, as shown in FIG. 3 Thickened section 74 has an arcuate inner concave side surface 76 concentric around the strut axis 35 and an arcuate outer convex side surface 78 concentric around coil axis 34.

Inner section 54 of the coil lowermost convolution fits against convex side surface 78, while outer section 56 of the lowermost spring convolution fits against peripheral flange 58 under compression of the coil spring. Concave side surface 76 of the upstanding lip 72 fits snugly against the outer side surface of fluid cylinder 10 to accurately locate section 54 of the spring convolution. Side surface 78 of lip section 74 has extensive surface area engagement with coil section 54 so as provide a reasonably good locator surface for the spring convolution, It will be seen from FIGS. 1 through 3 that seating surface 50 includes an exposed surface area 57 located radially outwardly from section 54 of the lowermost coil convolution. During full compression of the coil spring the second convolution of the spring can seat against exposed surface area 57 alongside coil section 54. The spring has an extensive travel, without undesired interference between. the coil convolutions.

In this invention the isolator pad 42 serves as the only device for locating the lowermost convolution of the coil spring. By controlling the manufacturing tolerances on the molded pad 42, it is possible to precisely control the location of the coil spring. Spring section 54 can be located in close proximity to the side surface of shock absorber cylinder 12 without having to rely on the platform 44 as a spring locator device.

Platform 44 is not used as a primary spring locator device. Therefore platform 44 can be a simple steel stamping devoid of complex bends or special wall configurations. The overall cost of the spring seat assembly 42, 44, is reduced due to weight reduction.

Figure 4:
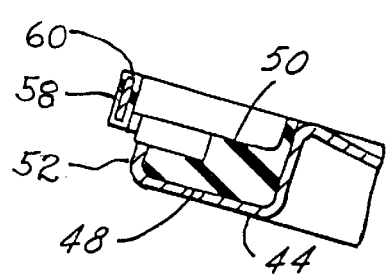
FIG. 4 is a fragmentary sectional view taken in a plane slightly offset from the plane of FIG. 2.
Figure 5:
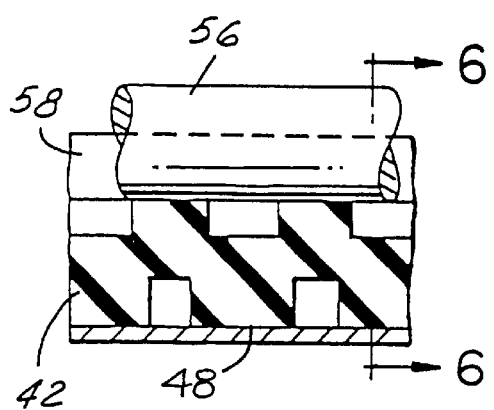
FIG. 5 is a fragmentary transverse sectional view taken on line 5—5 in FIG. 2.
Figure 6:
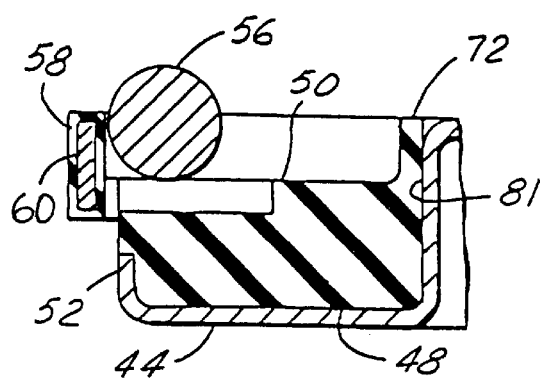
FIG. 6 is a fragmentary sectional view taken on line 6—6 in FIG. 5.

Peripheral flange 58 acts as a containment mechanism for the lowermost convolution of spring 36; e.g., in the event of coil spring breakage. As shown in FIGS. 2, 4 and 6, flange 58 is reinforced by an annular (endless) rigid band 60 incorporated within the flange during the pad molding operation; i.e., band 60 is positioned as an insert in the mold that is used to from the elastomeric pad.

Band 60 is preferably formed out of steel or other high strength material. Preferably the band has a rectangular cross section, as shown in FIG. 6, whereby the reinforcement action of the band extends through substantially the entire height of flange 58.

The major axis of the rectangle is normal to the plane of the elastomeric pad so that band 60 extends an appreciable distance above the pad.

As shown in FIG. 6, the height of flange 58 is greater than one half the diameter of the coil cross section, such that the coil convolution is prevented from riding up over the edge of flange 58 in event of spring breakage.

An advantage of incorporating the rectangular reinforcing band into the elastomeric pad (rather than making the reinforcement part of the rigid platform) is that the overall diameter of the spring seat assembly can be slightly reduced. Also, the weight of the rigid platform can be somewhat reduced. Further, by locating reinforcement band 60 in the pad flange 58 there is a greater conformity of the reinforcement band to the opposing surface of the coil convolution. Also, the reinforcement band can be formed out of a high strength material resistant to fracture or failure under the expected load forces.

What is claimed is:

1. A vehicle shock absorber strut assembly comprising:

a strut comprising a fluid cylinder and a piston;

an annular coil spring positioned about the strut;

a pad for seating the annular coil spring; and an annular rigid platform affixed to said strut, wherein the pad comprises an annular elastomeric spring-seating surface positioned on said platform; said spring-seating surface having an upper surface, an annular peripheral edge spaced outwardly from the shock absorber a strut, and an elastomeric upstanding flange extending along said peripheral edge, said elastomeric flange projecting upwardly from the pad upper surface for containing a portion of the coil spring in the event of coil spring failure, and a rigid, nonelastomeric insert encapsulated within said flange for reinforcing the flange against outward deformation, said nonelastomeric insert comprising a one piece band having a rectangular cross section, the major axis of the rectangle being normal to the plane of the elastomeric pad, so that the band extends an appreciable distance above the pad upper surface.

2. The strut assembly of claim 1, wherein the coil spring has a circular cross section; said peripheral flange having a height that is greater than one half the diameter of the coil spring circular cross section.

3. The strut assembly of claim 1, wherein said coil spring comprises a lowermost convolution seated on said elastomeric pad, said lowermost convolution comprising an inner arcuate section located relatively close to the strut, an outer arcuate section spaced away from the strut, and a spiral section joining said inner and outer sections; said elastomeric pad having an exposed surface adapted to seat a second spring convolution when the spring is filly compressed; said peripheral flange being concentric around the coil spring axis, so that the second spring convolution is located within said peripheral flange when the spring is fully compressed.

* * * * *